US011784950B2

(12) United States Patent
Kuenzi et al.

(10) Patent No.: US 11,784,950 B2
(45) Date of Patent: Oct. 10, 2023

(54) MESH NETWORKING USING PEER TO PEER MESSAGES FOR A HOSPITALITY ENTITY (71) Applicant: Carrier Corporation, Palm Beach Gardens, FL (US)

(72) Inventors: Adam Kuenzi, Silverton, OR (US); Michael Lang, Oregon City, OR (US); Steve Switzer, Atlanta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 225 days.

(21) Appl. No.: 17/172,801

(22) Filed: Feb. 10, 2021

(65) Prior Publication Data
US 2021/0168106 A1 Jun. 3, 2021

Related U.S. Application Data (62) Division of application No. 16/184,118, filed on Nov. 8, 2018, now Pat. No. 11,632,343.
(Continued)

(51) Int. Cl.
H04L 51/08 (2022.01)
H04W 4/70 (2018.01)
(Continued)

(52) U.S. Cl.
CPC .......... H04L 51/08 (2013.01); G07C 9/00174 (2013.01); G07C 9/00571 (2013.01);
(Continued)

(58) Field of Classification Search
None
See application file for complete search history.

(56) References Cited

U.S. PATENT DOCUMENTS 7,126,926 B1 10/2006 Bjorklund et al.
7,345,998 B2 3/2008 Cregg et al.
(Continued)

FOREIGN PATENT DOCUMENTS

CN 102779323 A 11/2012
CN 103177495 A 6/2013
(Continued)

OTHER PUBLICATIONS

U.S. Non-Final Office Action for U.S. Appl. No. 16/181,565; dated Mar. 25, 2021; 32 Pages.
(Continued)

Primary Examiner — Jutai Kao
(74) Attorney, Agent, or Firm — CANTOR COLBURN LLP (57) ABSTRACT A method and system for communicating with wireless messaging enabled door locks. The method includes advertising availability of the door lock via wireless messaging for a first period of time; triggering a message send event; determining a destination node; connecting to the destination node; sending the message to the destination node; and entering a low power state for a second period of time, wherein the second period of time is longer than the first period of time; wherein the destination node is chosen from a second door lock or a computing system.

13 Claims, 6 Drawing Sheets

Related U.S. Application Data (60) Provisional application No. 62/583,125, filed on Nov. 8, 2017.

(51) Int. Cl.

| | | |
|---|---|---|
| *H04W 52/02* | (2009.01) | |
| *H04W 8/00* | (2009.01) | |
| *H04W 4/06* | (2009.01) | |
| *G07C 9/00* | (2020.01) | |
| *H04W 40/30* | (2009.01) | |
| *H04W 40/22* | (2009.01) | |
| *H04L 67/12* | (2022.01) | |
| *H04W 40/24* | (2009.01) | |
| *H04L 67/51* | (2022.01) | |
| *H04W 84/18* | (2009.01) | |

(52) U.S. Cl.
CPC .............. *H04L 67/12* (2013.01); *H04L 67/51* (2022.05); *H04W 4/06* (2013.01); *H04W 4/70* (2018.02); *H04W 8/005* (2013.01); *H04W 40/22* (2013.01); *H04W 40/244* (2013.01); *H04W 40/30* (2013.01); *H04W 52/0209* (2013.01); *H04W 52/0225* (2013.01); *H04W 52/0251* (2013.01); *G07C 9/00309* (2013.01); *G07C 2009/00642* (2013.01); *H04W 84/18* (2013.01)

(56) References Cited

U.S. PATENT DOCUMENTS

| | | | |
|---|---|---|---|
| 7,346,331 | B2 | 3/2008 | Taylor et al. |
| 7,515,033 | B2 | 4/2009 | Roosli et al. |
| 7,701,331 | B2 | 4/2010 | Tran |
| 7,961,674 | B2 | 6/2011 | Jing et al. |
| 8,331,544 | B2 | 12/2012 | Kraus et al. |
| 8,805,712 | B2 | 8/2014 | Black |
| 9,258,281 | B2 | 2/2016 | Metivier et al. |
| 9,317,984 | B2 | 4/2016 | Cregg et al. |
| 9,324,203 | B2 | 4/2016 | Cregg et al. |
| 9,347,242 | B2 | 5/2016 | Cregg et al. |
| 9,437,063 | B2 | 9/2016 | Schoefelder et al. |
| 9,558,604 | B2 | 1/2017 | Robertson et al. |
| 9,697,661 | B1 | 7/2017 | Dumas et al. |
| 9,721,413 | B2 | 8/2017 | Dumas et al. |
| 2005/0210283 | A1 | 9/2005 | Kato |
| 2009/0135750 | A1 | 5/2009 | Ratiu et al. |
| 2013/0210493 | A1 | 8/2013 | Tal et al. |
| 2014/0146739 | A1 | 5/2014 | Zhang et al. |
| 2014/0340196 | A1 | 11/2014 | Myers et al. |
| 2014/0355582 | A1 | 12/2014 | Kamath et al. |
| 2016/0088424 | A1 | 3/2016 | Polo et al. |
| 2017/0127222 | A1 | 5/2017 | Lang et al. |
| 2017/0180539 | A1 | 6/2017 | Payack, Jr. |
| 2017/0353431 | A1 | 12/2017 | Tjahjono et al. |
| 2018/0270311 | A1* | 9/2018 | Baker .................. A24F 40/50 |
| 2018/0288563 | A1* | 10/2018 | Krzych ................ H04W 4/021 |
| 2019/0141500 | A1 | 5/2019 | Kuenzi et al. |
| 2019/0141616 | A1 | 5/2019 | Kuenzi et al. |
| 2019/0289553 | A1* | 9/2019 | Kincaid ............. G07C 9/00174 |
| 2020/0288266 | A1 | 9/2020 | Alexander et al. |

FOREIGN PATENT DOCUMENTS

| | | |
|---|---|---|
| CN | 104217478 A | 12/2014 |
| CN | 104809793 A | 7/2015 |
| CN | 204856668 U | 12/2015 |
| WO | 2002078229 A1 | 10/2002 |
| WO | 2017196883 A1 | 11/2017 |

OTHER PUBLICATIONS

Darroudi, Seyed Mahdi, et al., "Bluetooth Low Energy Mesh Networks: A Survey", Sensors, published Jun. 22, 2017, 19 pages.
European Office Action for application EP 18204907.2, dated Mar. 4, 2020, 10 pages.
European Search Report for application 18204912.2, dated Mar. 13, 2019, 9 pages.
European Search Report for application EP 18204907.2, dated Mar. 14, 2019, 12 pages.
Stack Overflow, "Wi-Fi vs Bluetooth Peer to Peer connection", available at: https://stackoverflow.com/questions/36276883/wi-fi-vs-bluetooth-peer-to-peer-connection, accessed Nov. 6, 2018, 8 pages.
Zheng, Rong, et al., "Asynchronous Wakeup for Ad Hoc Networks", Proceedings of the 4th ACM International Symposium on Mobile Ad Hoc Networking and Computing, Jun. 1, 2003, 11 pages.

* cited by examiner

MESH NETWORKING USING PEER TO PEER MESSAGES FOR A HOSPITALITY ENTITY

CROSS-REFERENCE TO RELATED APPLICATIONS

This application is a divisional of U.S. patent application Ser. No. 16/184,118 filed Nov. 8, 2018, which claims the benefit of U.S. provisional patent application Ser. No. 62/583,125, filed Nov. 8, 2017, the entire contents of which are incorporated herein by reference.

BACKGROUND

Exemplary embodiments pertain to the art of computing. In particular, the present disclosure relates to mesh networking of wireless messaging devices.

Bluetooth is a popular wireless communication protocol for transmitting data over short distances. Bluetooth is commonly used with today's mobile electronic devices, connecting devices such as headphones, headsets, watches, keyboard, mice, mobile phones, tablets, and sporting equipment. While the above-described devices are a one-to-one connection, there can be a desire to couple together many devices in a mesh network. However, today's mesh networking can require additional routing nodes. Routing nodes can add undesirable cost and complexity to a network.

BRIEF DESCRIPTION

According to one embodiment, a method and system for communicating with wireless messaging enabled door locks is disclosed. The method includes advertising availability of the door lock via wireless messaging for a first period of time; triggering a message send event; determining a destination node; connecting to the destination node via wireless messaging; sending the message to the destination node; and entering a low power state for a second period of time, wherein the second period of time is longer than the first period of time; wherein the destination node is chosen from a second door lock or a computing system.

In addition to one or more features described above, or as an alternative, further embodiments may include wherein: determining a destination node further comprises: examining a routing table to determine the destination node; and searching for a second advertisement signal from the destination node.

In addition to features described above, or as an alternative, further embodiments may include wherein examining a routing table comprises determining a primary destination node and a secondary destination node; and searching for the destination node advertisement comprises first searching for the primary destination node advertisement and subsequently searching for the secondary destination node advertisement.

In addition to features described above, or as an alternative, further embodiments may include wherein the routing table comprises a downstream routing table for communications in one direction and an upstream routing table for communications in a second direction.

In addition to features described above, or as an alternative, further embodiments may include wherein determining the destination node comprises determining a direction of the communication.

In addition to features described above, or as an alternative, further embodiments may include wherein determining that the message includes broadcast information; and sending the information to both the primary destination node and the secondary destination node.

In addition to features described above, or as an alternative, further embodiments may include wherein determining that the message includes broadcast information; examining the routing table to determine a destination for broadcast information; and sending the information to the destination for broadcast information.

In addition to features described above, or as an alternative, further embodiments may include wherein the message is a message bundle; and wherein the method further comprises: adding information to the message bundle prior to sending the message.

In addition to features described above, or as an alternative, further embodiments may include wherein triggering the message send event comprises expiration of an audit timer.

In addition to features described above, or as an alternative, further embodiments may include wherein data sent after expiration of the audit timer includes: battery status, diagnostic information, entry events, and room temperature.

According to one embodiment, a system of door locks forming a mesh network is disclosed. A system includes a central computing device; a plurality of door locks with wireless messaging capability, each door lock configured to: advertise the availability of the door lock via wireless messaging for a first period of time; trigger a message send event; determine a destination node; connect to the destination node via wireless messaging; send the message to the destination node; and enter a low power state for a second period of time, wherein the second period of time is longer than the first period of time.

In addition to features described above, or as an alternative, further embodiments may include wherein each door lock is configured to repeat the advertising after expiration of the second period of time.

In addition to features described above, or as an alternative, further embodiments may include wherein triggering the message send event comprises determining existence of an exception event In addition to features described above, or as an alternative, further embodiments may include wherein the exception event comprises one or more of the following: unauthorized entry, attempted unauthorized entry, credential change, a locking plan change, and a door lock being in an open position for greater than a threshold amount of time.

In addition to features described above, or as an alternative, further embodiments may include wherein a credential change comprises one or more of the following: an authorization of a key card; a de-authorization of a key card; an authorization of a wireless messaging enabled mobile electronic device; and a de-authorization of a wireless messaging enabled mobile electronic device.

In addition to features described above, or as an alternative, further embodiments may include wherein triggering the message send event comprises expiration of an audit timer; and wherein: data sent after expiration of the audit timer includes: battery status, diagnostic information, entry events, and room temperature.

In addition to features described above, or as an alternative, further embodiments may include wherein triggering the message send event comprises determining the door lock information has information to be transmitted.

In addition to features described above, or as an alternative, further embodiments may include wherein: determining the door lock has information to be transmitted comprises determining existence of an exception.

In addition to features described above, or as an alternative, further embodiments may include wherein determining a destination node comprises scanning for a second advertisement signal from a nearby second door lock.

In addition to features described above, or as an alternative, further embodiments may include wherein the message is a message bundle; and wherein each door lock of the plurality of door locks is further configured to: add information to the message bundle prior to sending the message.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, Bluetooth is a wireless protocol commonly used to couple together electronic devices. Because the electronic devices that use Bluetooth might be portable, those devices typically use batteries to power the Bluetooth connectivity. While some embodiments are described herein with respect to Bluetooth, it should be understood that embodiments can be used with any type of wireless messaging protocol, such as WiFi, Zigbee, Z-Wave, or any wireless protocol currently in existence or developed in the future.

A mesh network is a network topology that includes multiple nodes. Each node in the network relays data for the network. All the nodes cooperate in the distribution of data in the network. A message in a mesh network travels from a source node to a destination node, possibly by "hopping" through intermediate routing nodes. A node may be a source node, a destination node, a routing node or any combination of these. The performance of a mesh network may be related to the number of hops between the source node and the destination node and to how quickly a message can be transmitted through routing nodes.

Some mesh networks utilize intermediate routing nodes to reduce message latency. A routing node is an extra device used specifically to route messages in a mesh network (in other words, they do not typically serve as a source node or a destination node). These routing nodes are generally highly available and ready to route a message for the quickest possible latency. These routing nodes are typically powered devices, because the power consumption required to be highly available is detrimental to battery life (because radio receivers consume a large amount of energy). When a source node generates a message, it can quickly connect and send messages through a routing node. However, in order to receive a message, a node must periodically check-in or otherwise synchronize to a timing signal from a routing node at regular intervals. The length of the regular interval is a key factor in determining the overall message delivery latency and also in determining battery life of the destination node.

In one or more embodiments, peer-to-peer messages are used to create a mesh network for sending messages without the use of intermediate routing nodes. When needed, each node in the mesh network switches between being a source, a destination, or a routing node. A node periodically advertises its availability by waking up briefly to advertise, be available, and then return to a sleep mode. If a source node connects during the short available period and passes a message along, the node will handle the message by determining that it is the destination, or by routing the message on to another destination node. Thereafter, the node again returns to sleep mode until its next scheduled available period. This allows the source node to be in a routing mode only when it has a message to send and only for as long as it takes to identify a destination node. The result is a mesh network implemented without the use of a powered intermediate routing node where the battery life of each node can be tuned relative to the message delivery latency by increasing or decreasing the advertising availability.

Figure 1:
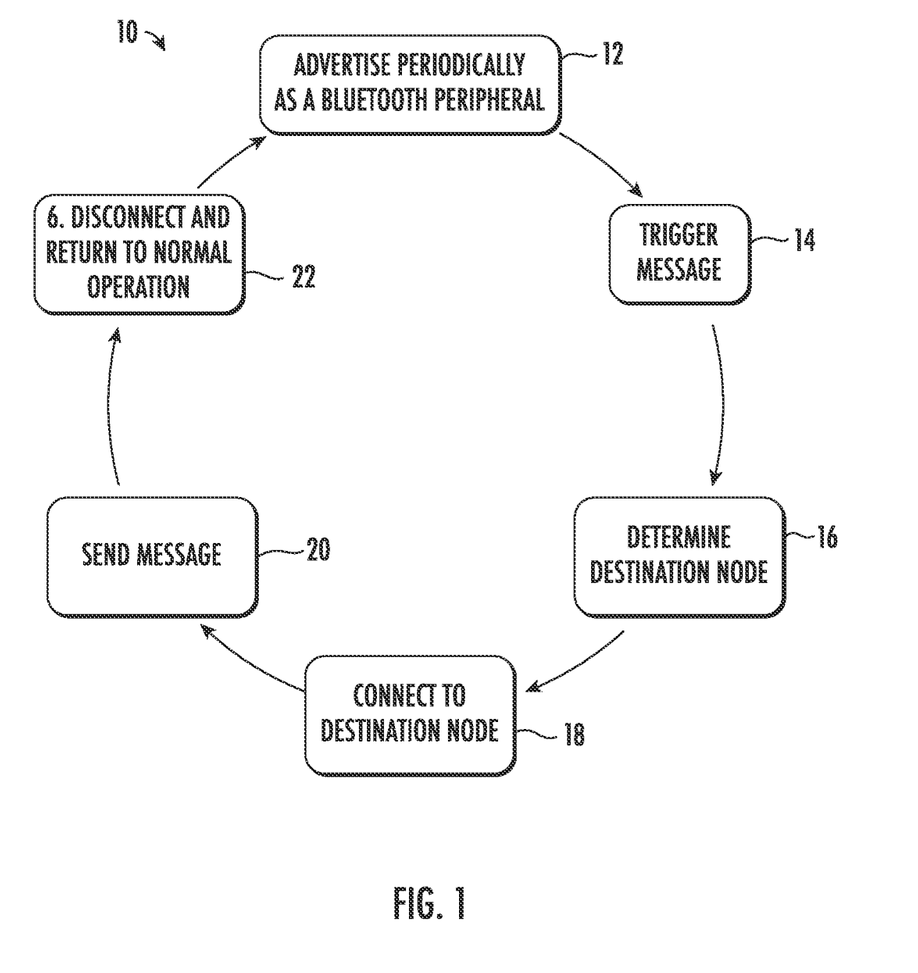
FIG. 1 is a flowchart illustrating the operation of one or more embodiments.

A flowchart illustrating method 10 is presented in FIG. 1. Method 10 is merely exemplary and is not limited to the embodiments presented herein. Method 10 can be employed in many different embodiments or examples not specifically depicted or described herein. In some embodiments, the procedures, processes, and/or activities of method 10 can be performed in the order presented. In other embodiments, one or more of the procedures, processes, and/or activities of method 10 can be combined or skipped. In one or more embodiments, method 10 is performed by a processor as it is executing instructions.

Method 10 illustrates the steps taken by a node within a mesh network that begins by operating as a single Bluetooth peripheral and where the mesh network includes multiple other nodes also operating as Bluetooth peripherals. Although the use of Bluetooth for communication is discussed, it should be understood that any type of wireless communication protocol can be used. The node advertises itself (block 12) as a Bluetooth peripheral. This advertising can comprise a periodic Bluetooth advertising message that indicates that the node is available and ready to be connected to by another node. The node does not itself connect and communicate with other nodes unless there is a message to send. When there is a message to send the node assumes the role of Bluetooth central until the message is sent and then returns to Bluetooth peripheral mode. Thus, most of the time when operating as a Bluetooth peripheral, the node is only awake for a brief period of time when advertising (a first time period) prior to being turned off, or to a sleep state, for a second time period. Typically, the second time period is longer than the first time period. The first and second time period can be adjusted. The battery life is related to the second time period, as a longer second time period leads to a longer battery life because the peripheral is consuming much less energy during the second time period than it consumes by advertising during the first time period. However, a longer second time period can result in lower latency, as will be described below. By making the second time period adjustable, a user can balance battery life with latency. Because each node in the network spends most of its time operating as a Bluetooth peripheral, and only assumes the Bluetooth central role when a message needs to be transmitted, the node is generally referred to herein as a peripheral.

When a peripheral has data to be sent, block 14 occurs. A peripheral can have data to be sent for a variety of reasons. For example, the data to be sent might originate with the peripheral. In another example, the peripheral can receive data from another node in the mesh network and desire to forward the data to another node in the mesh network. Either of these situations can be considered a trigger message. A message contains the data to be sent from one node in the mesh to another. The words data, information, and message are used interchangeably herein but essentially mean the same thing, however more specifically a message will contain data that encodes information. The message is transferable from one node to another. The data can be processed by a receiving node to determine the information. In addition to a message containing data, the message may contain additional data that is an indication of the source node, final destination node, routing information, priority information, message integrity information or other information typically transferred in a digital message. Data contained in messages may be encrypted using various methods well known in the art of message delivery.

When the peripheral has data to send, it determines a destination node (block 16). The additional data contained in the message can be used to determine the destination node. Also, if the trigger (block 14) occurs within a peripheral, determining the destination (block 16) may be using a pre-programmed destination that may be configured in the peripheral and associated with the type of trigger. Some data from the peripheral may need to be sent to a central node. Other data from the peripheral may need to be sent to another destination node. The destination node may be the final destination for the message or it may be a receiving node as the next step in the route on the way to a final destination node. In some embodiments, there can be a routing table that determines a best receiving node location to send the data to, depending on the destination. The use of a routing table will be discussed in greater detail below. In some embodiments, the peripheral can operate briefly as a Bluetooth central and perform a Bluetooth scan to find a receiving node operating as a peripheral. The scan can detect an advertisement of the receiving peripheral, where the advertisement is similar to the advertisement of block 12. By comparing received advertisements from nearby peripherals with the expected best peripherals identified from the routing table, the sending node can determine the next available receiving node to send the message to.

When the sending peripheral detects the receiving peripheral, the sending peripheral node, again temporarily operating as a Bluetooth central, establishes a connection with the receiving peripheral node which is operating as a Bluetooth peripheral (block 18). In some embodiments, the detection occurs when the sending peripheral detects the receiving peripheral's advertisement. Latency is the delay that occurs between when the sending peripheral first attempts to send the data at block 16 and when the peripheral finally connects with the receiving peripheral at block 18.

Once the connection is established, the peripheral sends the data to the receiving peripheral (block 20). Thereafter, the peripheral disconnects and returns to normal operation again as a Bluetooth peripheral (block 22). At this point, the receiving node may utilize method 10 to also transfer the message to yet another node in the mesh network.

A mesh network utilizing method 10 takes advantage of the fact that each peripheral in the mesh network is only on for a very short period of time during the advertisement phase (block 12) and is off for longer periods of time. In some embodiments, the length of the advertisement phase (the first time period) is on the order of 5 milliseconds and is just long enough to send one Bluetooth advertisement on each advertising channel, while the length of the idle phase (the second time period) is on the order of 1 second. While a long idle phase might not be feasible in some Bluetooth connections (for example, a headset, a keyboard, or mouse needs to transmit data much more often), other types of peripherals can greatly benefit from such a mesh network. Particularly included in this category are peripherals that only need to transmit data relatively rarely. One such peripheral can include door locks, as will be described in further detail below.

The above described method uses less battery power because each peripheral in the mesh network is only "on" for a short period of time—if there is no data to transmit, the peripheral turns off again. There is also no need of a synchronized clock between a node and a routing node which lessens the power requirement of each peripheral. The clocks do not need to be synchronized, because, when data needs to be sent, a peripheral merely searches for an advertisement signal from a neighboring peripheral, then begins transmission. Because the advertisement signals are periodic from each node, the additional time required to scan for the next advertisement adds an understood and minimal amount to the message latency in a way that is tunable by the time period. Thus, each hop or transmission of a message from one node to another will add time to the overall message latency corresponding to the amount of the second time period. In one example embodiment, if the second time period is 1 second, then on average it will take ½ of the second time period, or ½ second to detect the receiving peripheral and then 1 more second to connect to the receiving peripheral on its next available period. If the expected receiving peripheral can be determined ahead of time from the routing table the hop may only take ½ second in this example if the sending peripheral is able to determine the destination node (step 16) without scanning and simply connects (step 18) directly to the receiving peripheral which would be available on average ½ second later. Further in this example, if a message requires 5 hops to get from a source to a destination, the overall message latency would be 5 times the single hop latency, or 5 times ½ second, or a total of 2.5 seconds of time to get from the source to the destination. By increasing or decreasing the second time period, this overall latency can be tuned to be faster or slower with the tradeoff being the battery life. Thus, synchronizing the time period between advertisement signals is not required for the purpose of ensuring latency when sending or receiving messages. In some embodiments, some messages can be held by a peripheral for a period of time, while other messages (termed "exceptions") should be sent immediately upon the generation of the message. Each of the peripherals can be considered a "peer". Thus, the mesh of peripherals can be considered a peer-to-peer network.

The above method can also be advantageously applied in situations where peripherals are required to be available for connection to a mobile device. An example is a mobile phone being used to open a hotel lock. In this example, the hotel lock may be periodically advertising as a Bluetooth peripheral so that it is available for connection at any time by a mobile device in order for a guest to open their hotel room door. In this example, a mesh network can easily be added to the hotel door locks without requiring any additional Bluetooth operation by the door lock except for when a message is triggered (step 14) to be sent or routed (steps 16, 18, and 20). If a traditional mesh network topology was used, either expensive routing nodes would be installed within range of all door locks or an additional wireless protocol would be added to communicate with routing nodes. The advantage of this method is the simplicity of operation of the network and its optimization for balancing between battery life and message latency.

Figure 2:
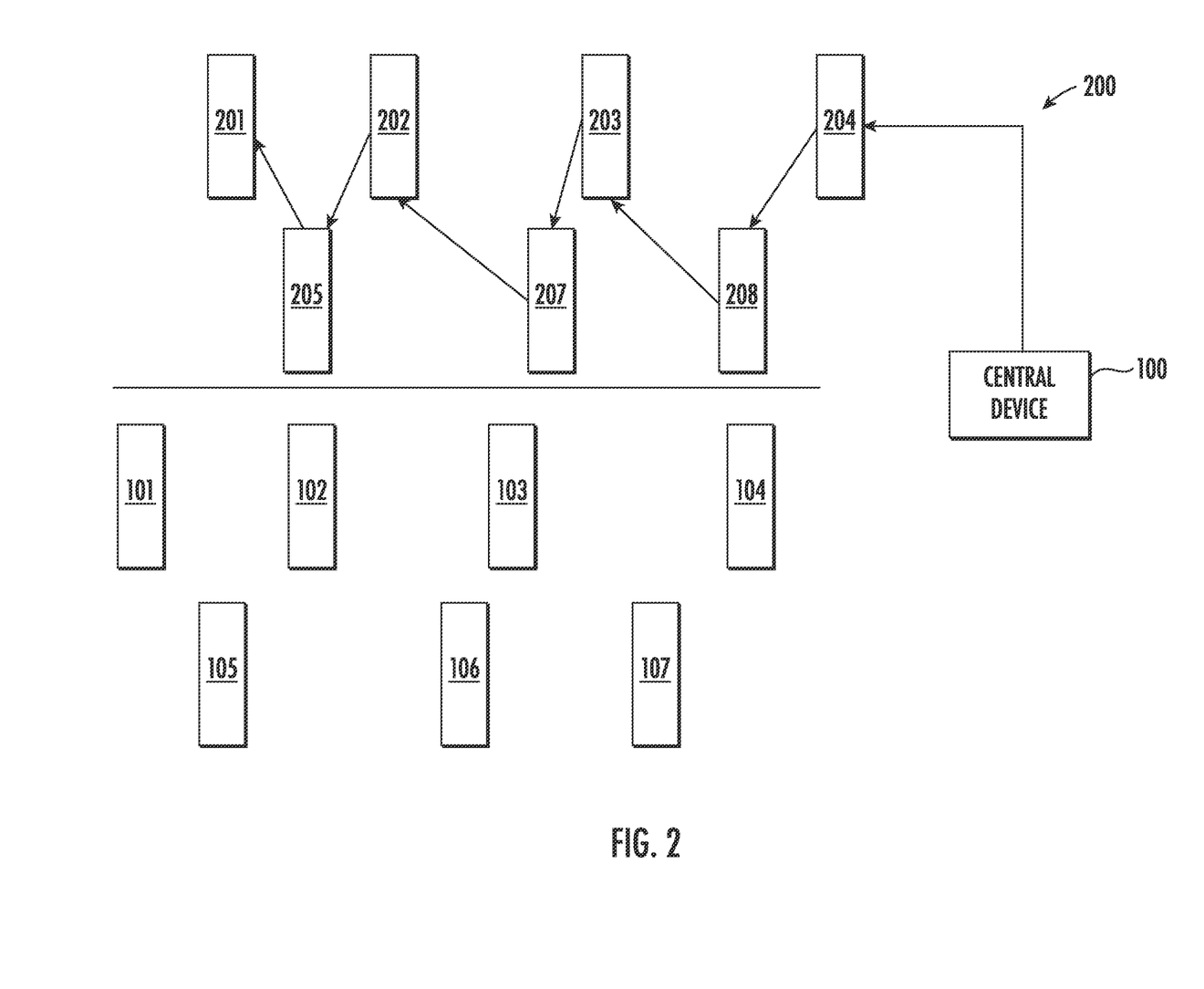
FIG. 2 is a block diagram illustrating an exemplary mesh network of one or more embodiments.

With reference to FIG. 2, an exemplary mesh network 200 including multiple peripherals is presented. Mesh network 200 includes nodes 201 through 208 as well as nodes 101 through 107. Mesh network 200 can also include a central device 100. Central device 100 can be any type of device that is used to communicate with each of peripherals 101 through 107 and peripherals 201 through 208. In some embodiments, central device 100 can include database capabilities, in order to store data transmitted by peripherals 101 through 107 and peripherals 201 through 208. In some embodiments, central device 100 can include programming capabilities such that central device 100 can produce instructions for any one of peripherals 101 through 107 and peripherals 201 through 208. Central device 100 can be embodied as a laptop computer, a desktop computer, a server, a cloud, a mobile electronic device, or any other type of computing device. While 14 peripherals are illustrated in FIG. 2, it should be understood that a greater or lesser number of peripherals can be present in other embodiments.

With continued reference to FIG. 2, the transmission of data through mesh network 200 is illustrated. In this example, central device 100 wants to send information to peripheral 201. The arrows in FIG. 2 show an exemplary path of the information. Central device 100 sends the information to peripheral 204. Peripheral 204 follows the method 10 shown in FIG. 1. For a second period of time, peripheral 204 is off, or unavailable. During a first period of time, peripheral 204 advertises its availability. During this first time period, central device 100 establishes communication with peripheral 204 and transmits data to peripheral 204.

Thereafter, this triggers peripheral 204, step 14 in FIG. 1, to search for another peripheral to send the data to. It eventually finds peripheral 208. The above-described steps are undertaken and peripheral 208 receives the data. This process is repeated for the transmission of data from peripheral 208 to peripheral 203; from peripheral 203 to peripheral 207; from peripheral 207 to peripheral 202; from peripheral 202 to peripheral 205; and finally from peripheral 205 to peripheral 201. As the final destination peripheral, peripheral 201 can then process, store, or otherwise use the data that was originally transmitted by central device 100. In some embodiments, peripheral 201 can send an acknowledgement back to central device 100 such that central device 100 can verify that the data was received by the destination peripheral. The above-described path also can be used to transmit data from central device 100 to each of the peripherals 201 through 208. For example, a universal configuration can be sent in such path. In another example, a query can be sent to each of the peripherals 201 through 208 (or subset thereof) in order to determine which peripheral meets a certain criteria. The above described path would have 7 hops and the overall latency would be determined as described above where the time required for each hop is related to the second time period.

For data that is specific to a certain peripheral, it should be understood that other paths can be chosen. For example, information can be transmitted directly from peripheral 202 to peripheral 201, without needing to use peripheral 205.

In some embodiments, the information can be in the form of a "message bundle." Instead of a message consisting of a single instruction for a specific peripheral (or all peripherals), a message from one peripheral can be appended to a message from another peripheral prior to being forwarded. A variety of different formats can be used for the message bundle. For example, there can be a portion of the message that notes the sending peripheral, followed by the message. Thus, a message from peripheral 202 can include "202" followed by the information. If peripheral 205 wanted to append to the message bundle, the resulting message bundle could include "202" followed by the information followed by "205," followed by its information.

Figure 3:
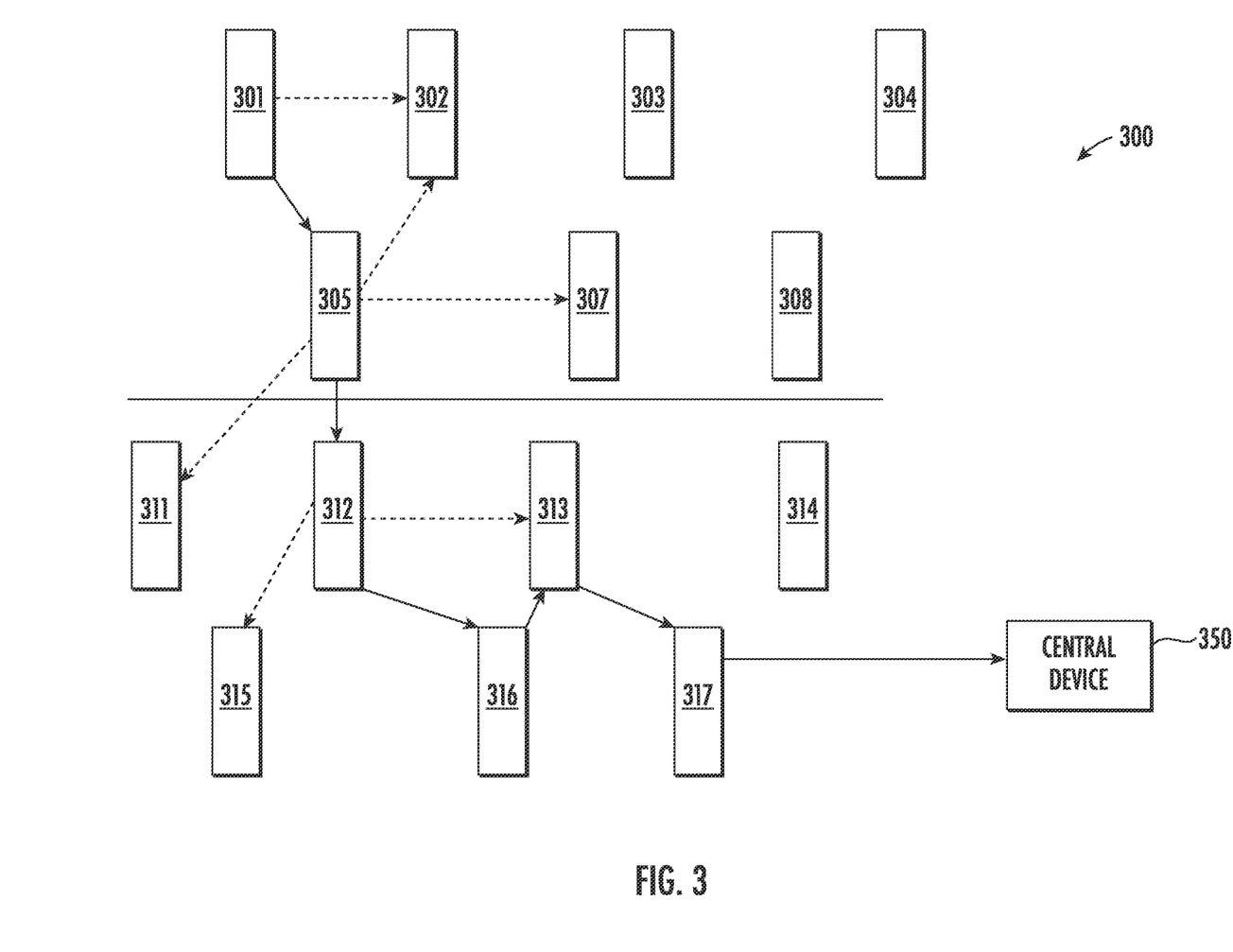
FIG. 3 is a block diagram illustrating an exemplary mesh network of one or more embodiments.

With reference to FIG. 3, an example of such a configuration is shown. Mesh network 300 includes peripherals 301 to 308 and peripherals 311 through 317 as well as central device 350. In this example, peripheral 301 is attempting to send a message to central device 350. Peripheral 301 sends the data to peripheral 305, using method 10 such as that described with respect to FIG. 1. While only 14 peripherals are illustrated in FIG. 3, it should be understood that a greater number of peripherals can be present in other embodiments.

Peripheral 305 also may have data to send to central device 350. After peripheral 305 receives the data from peripheral 301, peripheral 305 appends the data it wants to send to central device 350 to the data it received from peripheral 301. This message bundle of data is then transmitted by peripheral 305 to the next device. As illustrated by the solid arrows, the message bundle is sent to peripheral 312. From there, the message bundle is sent to peripheral 316, then to peripheral 313, then to peripheral 317, before being sent to central device 350. It should be understood that the message bundle is sent from one peripheral to the next peripheral using techniques illustrated in FIG. 1. It should be understood that, although only a single peripheral (element 305) adding to the message bundle is discussed, any number of peripherals can add to the message bundle. For example, in an embodiment where each peripheral sends a periodic status update, each peripheral can add their status to the message bundle before sending the message bundle to the next peripheral. By using the message bundle, the total number of messages transmitted throughout the mesh network is reduced.

In some embodiments, the mesh network illustrated in FIG. 3 is capable of "intelligent routing." As discussed above, peripheral 305 is attempting to send the message bundle to central device 350. Peripheral 305 can send the message bundle via the methods described above. In some embodiments, the message bundle can include critical information that needs to be sent to central device 350 as soon as possible. In such a scenario, peripheral 305 is able to send a command (illustrated by the dashed arrows) to its neighboring peripherals (302, 307, and 311). The command can shut down communications from peripherals 302, 307, and 311 to ensure that no other communications from those peripherals are active at that point in time. Thus, when the message bundle is received by peripheral 312, that peripheral is able to forward the message bundle without having to worry about peripherals 302, 307, and 311 simultaneously trying to send its own message bundle. Similarly, peripheral 312 can temporarily shut down communications from peripheral 315 and 313.

Figure 4:
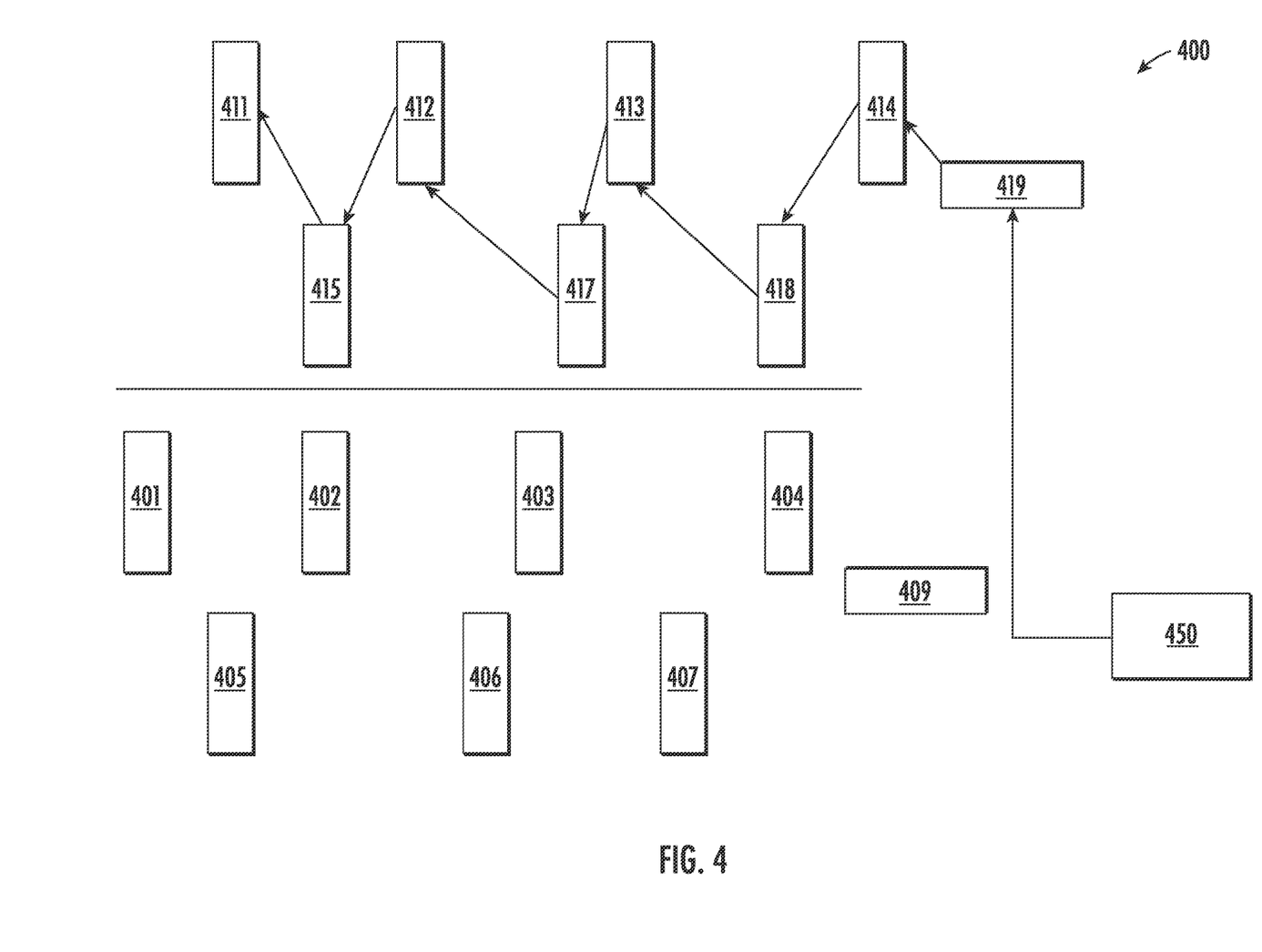
FIG. 4 is a block diagram illustrating an exemplary mesh network of one or more embodiments.

The embodiments described above can be expanded upon through the use of one or more gateways. With reference to FIG. 4, a mesh network 400 is illustrated. A central device 450 is present in a manner similar to FIGS. 2 and 3. Also present in mesh network 400 are peripherals 401 through 407 and peripherals 411 through 418, in a manner similar to that described with respect to FIG. 3.

Also present in mesh network 400 are gateways 409 and 419. Gateway 409 is coupled to peripheral 404, while gateway 419 is coupled to peripheral 414. The gateway devices 409, 419 are of a powered device type where the communications between the gateway and the central device 450 is of a high-speed network type, whereas the communication between the gateway and mesh network 400 is using method 10 in FIG. 1. High-speed networks may be wireless, for example Wi-Fi, Cellular, or the like. High-speed networks may also be wired, for example Ethernet, fiber optic, or the like. In general, the high-speed network is of a type typically installed as a data communications network in a building, between buildings, or as available for communications with mobile equipment. An advantage of using this configuration is that, if data is to be sent between central device and any of peripherals 411 through 418, such a data transfer does not involve any of peripherals 401 through 407. Similarly, if data is to be sent between central device and any of peripherals 401 through 407, such a data transfer does not involve any of peripherals 411 through 418. Additionally, when the message is transferred over the hop from the central device 450 to gateway 419 or 409 the latency incurred in this particular hop is much smaller (or even negligible) compared to the latency incurred in the mesh network 100 when using method 10.

The result is that there are fewer bottlenecks. In the embodiment shown in FIG. 3, the closest peripheral (304) receives every communication intended for central device 350. Thus, there could be bottlenecks if peripheral 304 has an inordinate amount of data flowing through it compared to other peripherals. In addition, such a configuration can be useful for embodiments where a large number of peripherals are being used. FIG. 4 only shows seven peripherals in each group. However, there could be hundreds or even thousands of peripherals in some embodiments, so reducing the amount of data flowing through any single peripheral can be advantageous. The layout shown in FIG. 4 also can be used in locations where there is a separation between peripherals 401 through 407 and peripherals 411 through 418. For example, peripherals 401 through 407 might be on one floor of a building while peripherals 411 through 418 are on another floor. The layout in FIG. 4 can also be used in locations where the number of hops between a source node and the central device 350 is too long for the desired latency and so additional gateways can be added to reduce the total number of hops between a node and the central device. The number of gateways added to a system can be optimized to tradeoff between the desired latency, desired battery life, and desired cost. In some embodiments there may be no or few gateways. In other embodiments there may be many gateways. But in each of these embodiments the mesh network 400 operates so that as many nodes as possible can be operated with the lowest possible installation cost.

Figure 5A:
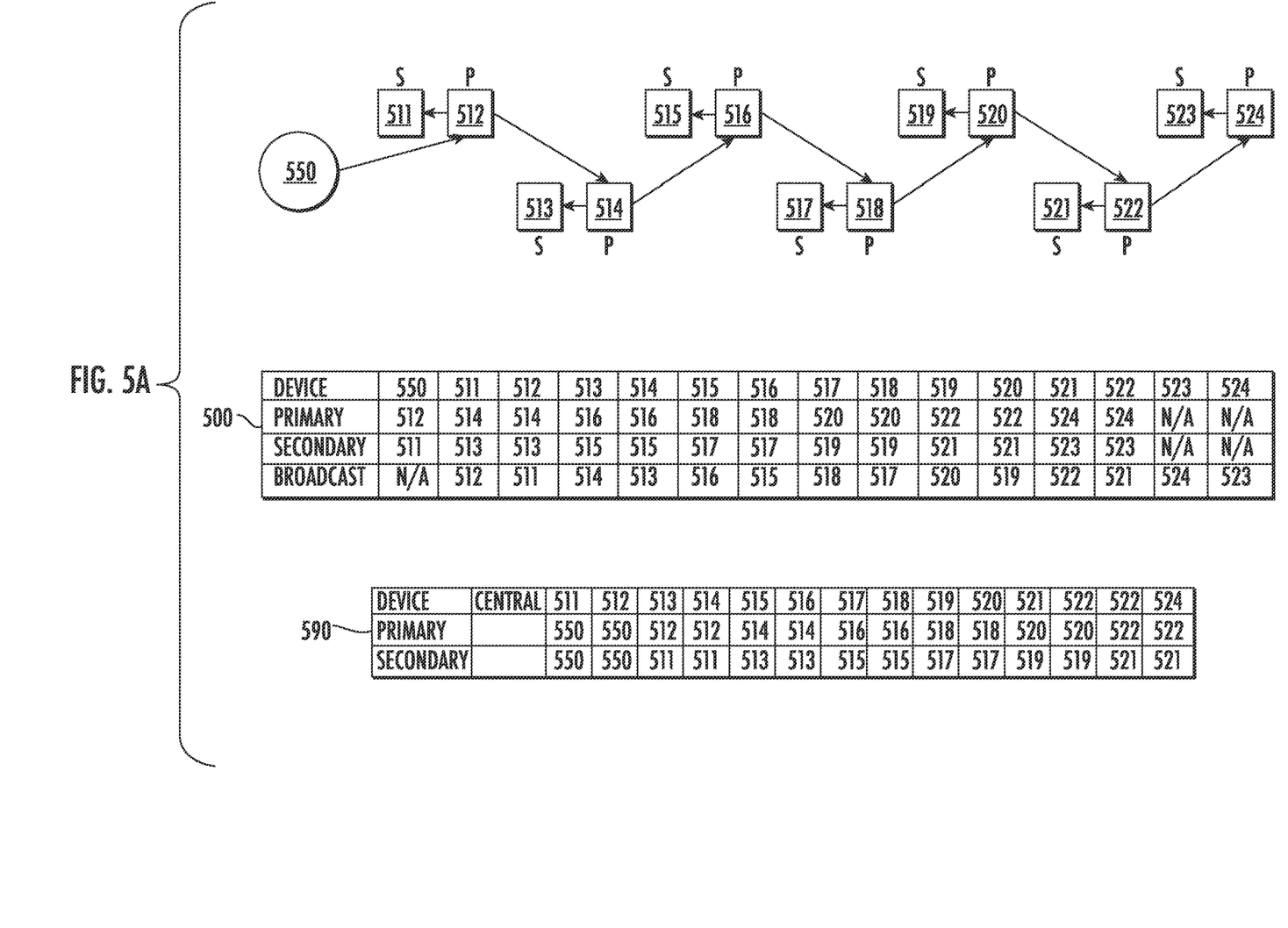
FIG. 5A is a block diagram illustrating an exemplary mesh network of one or more embodiments.

As discussed above, there can be a variety of different manners in which a peripheral decides to which other peripheral to send a message or the message bundle. In some embodiments, a routing table is used. An exemplary downstream (from the central device to the peripherals) routing table 500 is shown in FIG. 5A, along with an exemplary group of peripherals. Each column in the routing table 500 represents a peripheral. Also present in FIG. 5A are peripherals 511 through 524 as well as central device 550. Each row in table 500 indicates a destination peripheral. The row for primary represents the first peripheral to send the message bundle. If it is not possible to send the message bundle to the primary peripheral, the message bundle is instead sent to the secondary peripheral. The broadcast row represents an additional peripheral to send the message bundle in the case of a broadcast message (a message intended for every peripheral as opposed to a specific peripheral.) The secondary peripheral is used if the primary peripheral is off-line or otherwise unable to receive the message bundle. For example, if peripheral 512 is attempting send a message bundle, it will attempt to send the message bundle to peripheral 514. However, if peripheral 514 is unavailable, the message bundle will be sent to peripheral 513 instead.

Also shown in FIG. 5A is an exemplary upstream (from the peripherals to the central device) routing table 590. Routing table 590 works in a similar manner to routing table 500. Each peripheral has both a primary and second peripheral to which the message bundle is sent, when the destination is the central device.

Figure 5B:
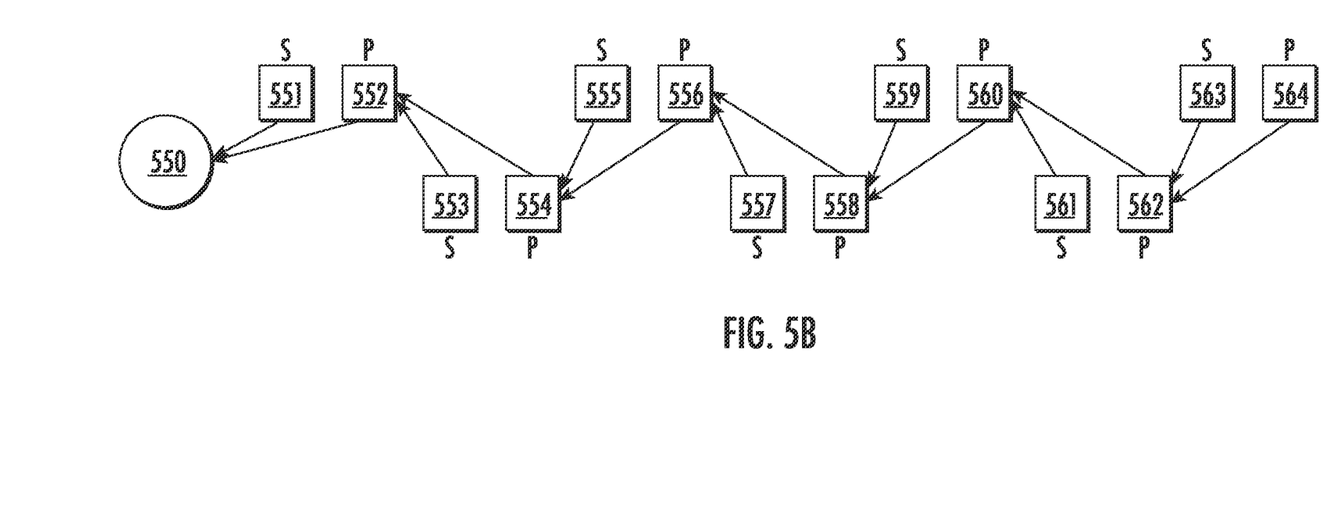
FIG. 5B is a block diagram illustrating an exemplary mesh network of one or more embodiments.

FIG. 5B illustrates an exemplary situation in which all of the peripherals send data to the central device. Such a situation can occur if each peripheral is audited in a periodic manner. For example, each of peripherals 551 through 564 might be tasked to send a log of all transactions processed by the peripheral. Peripherals 564 and 563 both send their data to peripheral 562 (the upstream primary peripheral for both peripherals 563 and 564.) Peripheral 562 combines the data from peripherals 564 and 563 into a single message bundle, to which peripheral 562 adds its own data. Then peripheral 562 sends the message bundle to peripheral 560. Peripheral 561 also sends its own message bundle to peripheral 560. This repeats for each of the peripherals until peripherals 551 and 552 send their respective message bundles to central device 550, containing the data from each of peripherals 551 through 564.

For each of the peripherals illustrated in FIGS. 5A and 5B, it should be understood that each peripheral sends the message bundle using the techniques described above with respect to FIG. 1. It should also be understood that, although only 14 peripherals are shown in FIGS. 5A and 5B, a greater or lesser number of peripherals can be used in various embodiments.

The above described mesh network can be used with respect to door locks. For example, a hospitality entity (such as a hotel, motel, or resort), can use one or more of the above described embodiments to maintain the door locks of the entity. In such an embodiment, each of the peripherals described above is a door lock and the central device can be a computer system that is accessible by a variety of hotel employees, such as reservations, the front desk, housekeeping, and security.

There are a variety of operations that can be performed from a central device to a door lock. For example, the front desk of a hotel might desire to reprogram a door lock to accept a certain key card or to not accept a certain key card or to accept an entry via a mobile electronic device (such as a smartphone). In such a case, the front desk of the hotel would use their computer system to direct the central device to issue an instruction to the correct door lock. For example, with reference to FIG. 5A, each of the peripherals can represent a room number of an associated door lock.

Information from the door locks to the central device might be sent more rarely. There can be audit information transmitted from each door lock to the central device. The audit information can include information as to when the door lock was accessed, by which card was the lock accessed, and at what time.

Because the timeliness of the audit information might not be of high importance to the hospitality entity, it might not be desirable to send this type of information every time the door lock is used. By reducing the number of times this type of information is sent to the central device, the battery life of each door lock is lengthened. In such a situation, each of the door locks can contain a memory and use the memory to store the audit information. Thereafter, in a periodic manner (such as twice a day), the door lock sends its audit information to the central device, using the embodiments described herein. Other type of information that could be treated as "store and forward" type of information includes battery status, diagnostic information, how long a guest was in the room, the time of use of each lock, room temperature, and each time the room was accessed by staff.

The central device also can send information to all of the door locks at regular intervals, such as calendar date and time synchronization information or instructions to send audit information or diagnostic information. Another type of information that can be sent from the central device to each of the door locks is information that is used by each door lock, such as information to deactivate a master key. Such information is needed by each door lock in the mesh network, so it would be sent in a broadcast format. A broadcast format is a type of message bundle in which each door lock not only retrieves and uses the information, but also forwards the message bundle to the next message bundle in the routing table.

There can be certain types of information that is sent immediately from the door locks to the central device. This information can be called "exceptions." One example of an exception is an unauthorized entry. For example, if the key for room 512 is used for room 516, an exception can be generated and the information is immediately sent to the central device. A similar situation can occur if a master key is used when it is not supposed to be used. For example, a housekeeper who is supposed to be cleaning floor 5 uses her key card to open a door on floor 4. Other type of information that is treated as an exception can include a door being held open for a long period of time, a locking plan change (e.g., when each key card is set to automatically expire after checkout).

The central device can also send a query to the door locks to request information. For example, if the central device wants to know the last time a specific master key was used, it can send a query to each door lock in the mesh network (or subset thereof). The response to the query can be treated in the same manner as an exception in that the response is immediately transmitted to the central device, as opposed to being stored in the door lock for later transmission during the periodic audit.

There are certain types of messages that may originate in one door lock to be sent to another door lock or to another device that is participating in the peer-peer mesh network without having the central device involved. For example, a door lock could send a message indicating that a guest just entered the room to a thermostat or similar device that is part of a room management system. In response to receiving the data, the thermostat could operate to a set point for comfort rather than for a set point for energy savings. Further, in this example the thermostat or room management device could also operate as a gateway device 409 or 419 as shown in FIG. 4 with a high-speed connection to the central device 450 also as shown in FIG. 4. Other example types of devices that originate messages may include sensors, such as smoke detectors, occupancy sensors, door sensors or the like to mention a few non-limiting examples. Other examples of gateway devices could include lighting systems, lighted exit signs, wireless network routers, to mention a few non-limiting examples.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for communicating with wireless messaging comprising:
    operating a first node in peripheral mode, the first node being battery powered;
    determining at the first node a message to be sent;
    switching the first node to central mode;
    the first node detecting an advertisement from a second node that the second node is available for connection, the second node being battery powered, the second node operating in peripheral mode;
    transmitting the message from the first node to the second node;
    reverting the first node to peripheral mode;
    switching the second node to central mode;
    the second node detecting an advertisement from a third node that the third node is available for connection, the third node being battery powered, the third node operating in peripheral mode;
    transmitting the message from the second node to the third node;
    reverting the second node to peripheral mode.

2. The method of claim 1 wherein the advertisement from the second node and the advertisement from the third node are asynchronous.

3. The method of claim 1 wherein the first node, the second node and the third node are door locks.

4. The method of claim 1 wherein:
    transmitting the message from the first node to the second node further comprises examining a routing table to determine a path from the first node to the second node.

5. The method of claim 1 wherein:
    determining at the first node the message to be sent comprises determining existence of an exception event.

6. The method of claim 5 wherein:
the first node comprises a first door lock;
the exception event comprises one or more of the following: unauthorized entry at the first door lock, attempted unauthorized entry at the first door lock, credential change at the first door lock, a locking plan change at the first door lock, and the first door lock being in an open position for greater than a threshold amount of time.

7. The method of claim 6 wherein:
the credential change comprises one or more of the following:
an authorization of a key card for the first door lock;
a de-authorization of a key card for the first door lock;
an authorization of a wireless messaging enabled mobile electronic device for the first door lock; and
a de-authorization of a wireless messaging enabled mobile electronic device for the first door lock.

8. A system of door locks forming a mesh network comprising:
a first door lock, a second door lock and a third door lock;
the first door lock operating a in peripheral mode, the first door lock being battery powered;
determining at the first door lock a message to be sent;
switching the first door lock to central mode;
the first door lock detecting an advertisement from the second door lock that the second door lock is available for connection, the second door lock being battery powered, the second door lock operating in peripheral mode;
transmitting the message from the first door lock to the second door lock;
reverting the first door lock to peripheral mode;
switching the second door lock to central mode;
the second door lock detecting an advertisement from the third door lock that the third door lock is available for connection, the third door lock being battery powered, the third door lock operating in peripheral mode;
transmitting the message from the second door lock to the third door lock;
reverting the second door lock to peripheral mode.

9. The system of claim 8 wherein the advertisement from the second door lock and the advertisement from the third door lock are asynchronous.

10. The system of claim 8 wherein:
transmitting the message from the first door lock to the second door lock further comprises examining a routing table to determine a path from the first door lock to the second door lock.

11. The system of claim 8 wherein:
determining at the first door lock the message to be sent comprises determining existence of an exception event.

12. The system of claim 11 wherein:
the exception event comprises one or more of the following: unauthorized entry at the first door lock, attempted unauthorized entry at the first door lock, credential change at the first door lock, a locking plan change at the first door lock, and the first door lock being in an open position for greater than a threshold amount of time.

13. The system of claim 12 wherein:
the credential change comprises one or more of the following:
an authorization of a key card for the first door lock;
a de-authorization of a key card for the first door lock;
an authorization of a wireless messaging enabled mobile electronic device for the first door lock; and
a de-authorization of a wireless messaging enabled mobile electronic device for the first door lock.

\* \* \* \* \*